(12) United States Patent
Kress et al.

(10) Patent No.: US 7,422,219 B2
(45) Date of Patent: Sep. 9, 2008

(54) INTERFACE OF A TOOL

(75) Inventors: Dieter Kress, Aalen (DE); Friedrich Häberle, Lauchheim (DE)

(73) Assignee: Mapal Fabrik fur Prazisionswerkzeuge Dr. Kress KG, Aalen (DE)

( * ) Notice: Subject to any disclaimer, the term of this patent is extended or adjusted under 35 U.S.C. 154(b) by 239 days.

(21) Appl. No.: 10/568,665

(22) PCT Filed: Jun. 17, 2004

(86) PCT No.: PCT/EP2004/006501

§ 371 (c)(1),
(2), (4) Date: Feb. 16, 2006

(87) PCT Pub. No.: WO2005/028148

PCT Pub. Date: Mar. 31, 2005

(65) Prior Publication Data

US 2006/0228183 A1    Oct. 12, 2006

(30) Foreign Application Priority Data

Aug. 22, 2003  (DE) ................. 103 38 610

(51) Int. Cl.
*B23B 31/16*  (2006.01)

(52) U.S. Cl. .......................... 279/67; 279/2.02; 279/20; 408/59; 409/136

(58) Field of Classification Search ................ 279/2.01, 279/2.02, 20, 66, 67; 408/57, 59; 409/135, 409/136

See application file for complete search history.

(56) References Cited

U.S. PATENT DOCUMENTS

| 4,844,671 | A | * | 7/1989 | Reinauer | ..................... 409/233 |
| 4,913,607 | A |   | 4/1990 | von Haas |  |
| 4,997,325 | A | * | 3/1991 | Heel et al. | .................. 409/233 |
| 5,035,557 | A | * | 7/1991 | Kohlbauer et al. | .......... 409/233 |

(Continued)

FOREIGN PATENT DOCUMENTS

DE    42 11 034 A1    10/1993

(Continued)

OTHER PUBLICATIONS

International Search Report (in English) for PCT/EP2004/006501, dated Oct. 22, 2004; ISA/EP.

*Primary Examiner*—Monica S. Carter
*Assistant Examiner*—Eric A Gates
(74) *Attorney, Agent, or Firm*—Harness, Dickey & Pierce, P.L.C.

(57) ABSTRACT

An interface of a tool is proposed with a first part serving as a seat having a female taper, which part has a first conduit section located concentrically to its center axis, a second part having a hollow shaft taper introduceable into the recess, which part has a second conduit section located concentrically to its center axis, where the center axes of the first and second parts align and having a collet chuck having two chuck jaws which comprises an actuating device coacting with the chuck jaws which can be activated by means of an actuating element. The characteristic feature of the interface is that the actuating device (43) has a caging element (47) which can be shifted to two operating positions and which has a central passage (71) which is located such that the center axes of the first and second parts (3, 5) pass through said passage.

8 Claims, 2 Drawing Sheets

U.S. PATENT DOCUMENTS

| | | | |
|---|---|---|---|
| 5,243,884 A * | 9/1993 | Haga et al. | 82/160 |
| 5,346,344 A * | 9/1994 | Kress et al. | 409/234 |
| 5,443,340 A * | 8/1995 | Reinauer et al. | 409/233 |
| 5,599,146 A | 2/1997 | Scheer | |
| 5,851,091 A * | 12/1998 | Klement | 409/232 |
| 5,860,776 A * | 1/1999 | Sato et al. | 409/233 |
| 5,865,578 A * | 2/1999 | Benedikter et al. | 409/233 |
| 6,419,430 B2 * | 7/2002 | Hangleiter | 409/233 |
| 6,457,920 B1 * | 10/2002 | Kleiner | 409/232 |
| 6,481,940 B2 * | 11/2002 | Prust et al. | 409/233 |
| 6,568,888 B2 * | 5/2003 | Hangleiter | 409/233 |
| 6,568,889 B2 * | 5/2003 | Rohm | 409/233 |
| 6,579,027 B1 | 6/2003 | Stolz | |
| 6,923,605 B2 * | 8/2005 | Jakob et al. | 409/233 |
| 7,165,921 B2 * | 1/2007 | Hangleiter | 409/233 |
| 7,195,431 B2 * | 3/2007 | Greif et al. | 409/233 |

FOREIGN PATENT DOCUMENTS

| | | |
|---|---|---|
| DE | 4231959 A1 * | 5/1994 |
| EP | 0 295 315 A | 12/1988 |
| EP | 0 563 979 B1 | 11/1995 |
| WO | WO-93/10930 A | 6/1993 |
| WO | WO-99/37428 A | 7/1999 |

* cited by examiner

INTERFACE OF A TOOL

The invention relates to an interface of a tool in accordance with the preamble of claim 1.

Interfaces of the type addressed here are well known. The term interface describes the connecting point between a machine spindle and a tool, a machine spindle and an adapter, an adapter and a tool, and similar; in general, the connecting point between two elements of a tool system. In the case of the tools being addressed here, they are those which remove cuttings from a work piece by means of a geometrically defined cutter, with the tool usually being set in rotational motion. A first part of the interface acts as the seat and has a female taper into which a hollow shank taper of a second part of the interface can be inserted. The hollow shank taper of the second part is pulled into the female taper of the first part by means of a clamping fixture, as a result of which typically circular flat surfaces on the first and second part are in tight contact with each other. In addition, the hollow shaft taper is preferably expanded slightly so that it abuts the inner surface of the female taper in the seat. The result is, first of all, exact alignment of the two parts of the interface and, secondly, a very high degree of rigidity. The clamping fixture has a collet chuck with two jaws which are moveable in the radial direction by means of an actuating device, that is to say, perpendicular to the axis of rotation of the tool. The collet chuck is anchored to the first part such that any axial displacement is prevented. The jaws coact with clamping shoulders on the hollow shaft taper such that the latter is drawn into the female taper. The displacement of the jaws is effected by means of an actuating device which can be activated through an actuator. Known interfaces have clamping screws which act as an actuating device and have two sections with opposite-hand threads. They coact with the chuck jaws and urge said jaws radially outward and inward, depending on the direction of rotation of the clamping screw. For example, an Allen wrench serving as the actuating device can be inserted into a matching recess in a clamping screw in order to rotate said screw to the right or to the left.

Minimum quantity lubrication is preferably used when machining work pieces, in which an air/oil mixture is used as the coolant and lubricant in place of an emulsion. The oil is present in extremely finely distributed droplets which float in the air and form a type of mist which wets the cutter(s) of a tool while a work piece is being machined, as well as any guideways if the need arises. In supplying the air/oil mixture, it is of crucial importance that as few changes of direction as possible, meaning deviations from a straight run, are present in the supply conduits because separation and pooling occur in the area of the bends. In the case of the known interface being discussed here, that is, using a clamping screw as the actuating device, a straight run for the supply passages for minimum quantity lubrication is not possible because the clamping screw runs perpendicularly through the body of the collet chuck.

The object of the invention is, therefore, to create an interface which is characterized by an improved coolant supply.

To achieve this object, an interface is proposed which has the features named in claim 1. The characteristic feature of the interface is that the actuating device which coacts with the jaws of the collet chuck is configured as a caging element which is moveable to two operating positions, having a central passage for the coolant/lubricant. The passage is located such that its center axis coincides with the center axes of the first and second part. Because the passage aligns with conduit sections in the first and second parts, changes of direction are avoided at which separation and pooling can occur. The interface with the features named here permits minimum quantity lubrication without any occurrence of the disadvantages named.

In a preferred embodiment of the interface, the actuating device is accessible through a first radial recess in the hollow shaft taper and through a second radial recess in the first part which aligns with the first recess. The actuator to activate the actuating device engages the actuating device inside the taper section. This permits overall length in the area of the interface to be short, resulting in a high degree of accuracy in the concentricity of the cutter of a tool clamped in position.

In a preferred embodiment of the interface, the caging element is provided with two lugs to which the chuck jaws are attached. The second of these lugs has a thread which coacts with a thread provided in the corresponding chuck jaw. An external thread is provided on the outside of the second lug which coacts with the internal thread of a cap nut. This cap nut in turn has an external thread on its outer surface which coacts with an internal thread in the corresponding chuck jaw. When the cap nut is rotated by means of an actuator, the cap nut on the appropriate lug is moved radially outward in one direction of rotation, as is the chuck jaw positioned on the cap nut. The chuck jaw bears against the inside of the hollow shaft taper so that the opposite jaw attached to the caging element also comes into engagement with the inside of the hollow shaft taper. When the cap nut is actuated, the chuck jaws and the caging element move. The passage in the caging element is configured such that it aligns with the conduit sections in the first and second part of the interface in both operating positions and no changes in direction can negatively affect the coolant/lubricant.

In a particularly preferred embodiment of the interface, a small tube leads through the first conduit section in the first part, through the passage in the caging element and through the second conduit section in the second section of the interface. This ensures that a continuous smooth inner surface is always provided for the coolant/lubricant over the entire length of the interface.

Additional embodiments can be derived from the remaining dependent claims.

The invention is explained in more detail in what follows with reference to the drawings.

Figure 1:
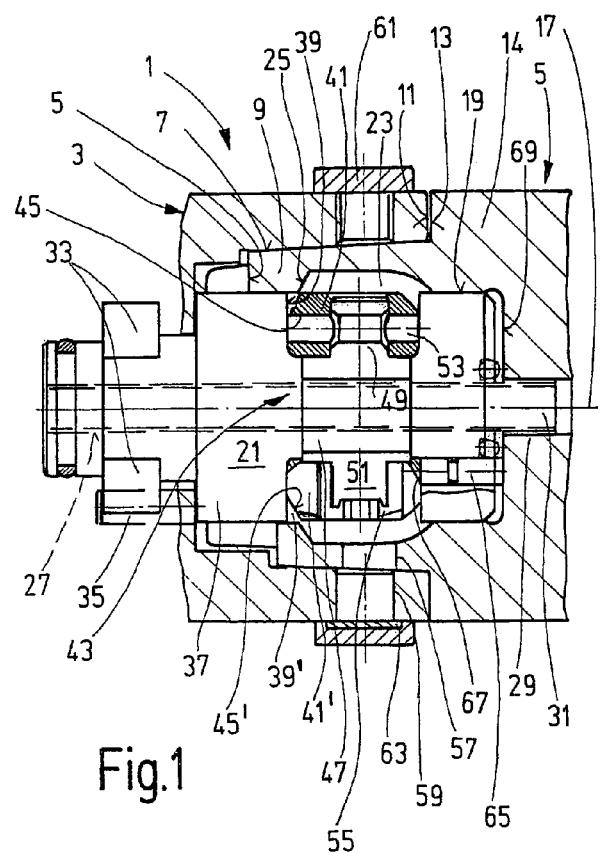
FIG. 1 shows a longitudinal section through an interface in the unclamped state.

FIG. 1 shows an interface 1 in longitudinal section with a first part 3, from which parts have been cut away for greater clarity, and a second part 5. The first part 3 acts as a seat for the second part and is therefore provided with a female taper 7 into which a preferably hollow-formed taper in the second part 5, a hollow shaft taper 9, is inserted. A first flat surface 11 configured as an annular surface which coacts with a second flat surface 13 on the second part 5 is provided on the face of the first part 3. The second flat surface is located on the end of the hollow shaft taper 9 opposite the free end 15 of said taper.

The second flat surface 13 is created by the main body 14 of the second part 5, from which parts have been deleted for reasons of greater clarity in the view selected here, having a larger outside diameter in the area of the second flat surface 13 than the hollow shaft taper 9.

The two flat surfaces 11 and 13 each lie in a plane running perpendicular to the center axis 17 of the interface 1. In the view shown here, which shows the interface 1 in the unclamped state, the two flat surfaces 11 and 13 lie at a distance from each other.

A bore 19—in this case cylindrical—is introduced into the hollow shaft taper 9 which serves to locate a clamping fixture configured as a collet chuck 21. An annular groove 23 with a clamping shoulder 25 running at an angle of preferably 30° to the center axis 17 is introduced into the wall of the cylindrical bore 19.

The collet chuck 21 has a continuous central full-length opening preferably configured as a drill hole 27 which continues in the view in accordance with FIG. 1 to the left in a first conduit section in the first part 3 not shown here, and to the right in a second conduit section 29 which is introduced into the second part 5. The latter conduit section can, for example, be implemented as a drill hole in the main body 14 of the second part 5. The center axes of the two conduit sections and the drill hole 27 coincide with the center axis 17 of the interface 1. A small tube 31 is preferably inserted into the first conduit section, into the drill hole 27 and the second conduit section 29 which has a continuous, constant inside diameter and thus functions as part of a coolant/lubricant supply.

Two projections 33 are provided on the outer wall of the collet chuck 21 which are part of a bayonet lock. The collet chuck 21 is firmly anchored in the first part 3 by this lock. Its locked position is secured by means of a heavy-duty dowel pin 35.

Two recesses 39, 39' are introduced into the main body 37 of the collet chuck 21 which serve to locate chuck jaws 41, 41'. Since the interface 1 in FIG. 1 is shown in the unclamped state, the chuck jaws 41. 41' are in their radially inward position, at their minimum distance from the center axis 17. The chuck jaws 41, 41' coact with an actuator 43 which can urge them radially inward and outward. FIG. 1 shows that the chuck jaws 41, 41' are provided on their radially outer side with a clamping surface 45, 45' which coact with the clamping shoulder 25.

The actuator 43 comprises a caging element 47 on which a first lug 49 is provided above the center axis 17 and a second lug 51 below the center axis. The first chuck jaw 41 is mounted to the upper first lug 49 and the second chuck jaw 41' to the lower second lug, where the first chuck jaw 41 is connected by means of a locking pin 53—here running parallel to the center axis 17—to the first lug 49 and the second chuck jaw 41' is connected by means of a thread to the second lug 51. In the case of the embodiment shown here, a cap nut 55 is provided between the second lug 51 and the second chuck jaw 41'.

The actuating device 43 is accessible from the outside. To achieve this, a first recess 57 is preferably introduced into the hollow shaft taper 9 and a second recess 59 into the wall of the first part 3, aligning with the first recess. An annular cover ring 61 which can be moved in the axial direction, that is, in the direction of the center axis 17 extends over the second recess 59 and protects the second recess 59 against the entry of dirt. In the embodiment shown here, a rubber element 63 is provided on the side of the cover ring 61 against the interface 1 which ensures the position of the cover ring 61 and improves its sealing properties in the area of the second recess 59. It is additionally possible to furnish the cover ring 61 with a radial recess and to rotate the ring such that this recess, when the situation requires, aligns with the first and second recess 57 and 59 to allow access to the actuating device.

An ejector pin 65, running essentially parallel to the center axis 17, is inserted into the main body of the collet chuck 21. The pin is moved axially to the right by an inclined surface 67 on the second chuck jaw 41' when the interface 1 is in the unclamped state and is pressed against a floor 69 of the cylindrical bore 19 and thus pushes the first and second part 3 and 5 of the first interface apart and allows the second part 5 to be removed easily from the first part 3.

Figure 2:
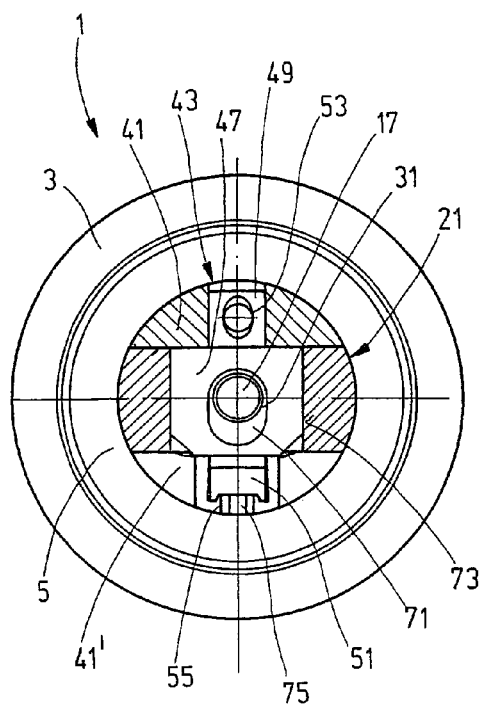
FIG. 2 shows a cross-section through the interface shown in FIG. 1.

FIG. 2 shows the interface from FIG. 1 in cross section. Identical parts are given the same reference numbers so that in this respect reference is made to the description for FIG. 1.

The drawing shows that the two parts 3 and 5 lie concentrically one inside the other. It can also be seen that the chuck jaws 41, 41' are in their retracted position. The cap nut 55 is threaded fully onto the second lug 51, so it is located at a minimum distance from the center axis 17. The small tube 31 lies concentric to the center axis.

FIG. 2 also shows the actuating device 43 with the caging element 47 and the lugs 49 and 51 attached to it. The caging element 47 is provided with an opening 71 running perpendicular to the plane of the illustration which is configured as an elongated hole. The opening is dimensioned such that the small tube 31 can be passed through it in both operating positions, of which the first, the unlocked position, is shown here.

The chucking element 21 is provided with a recess 73 whose center axis coincides with a perpendicular diameter line and which is selected to be large enough that it can receive the caging element 47. The side walls of the recess 73 guide the caging element 47 in its motion which brings about the clamping/unclamping of the two parts 3 and 5.

FIG. 2 shows also that the cap nut 55 is furnished with an actuating opening 75, for example, with a hexagonal recess which an actuating element configured as an Allen key can engage. The shape of the recess, however, is irrelevant for the operation of the actuating device.

Figure 3:
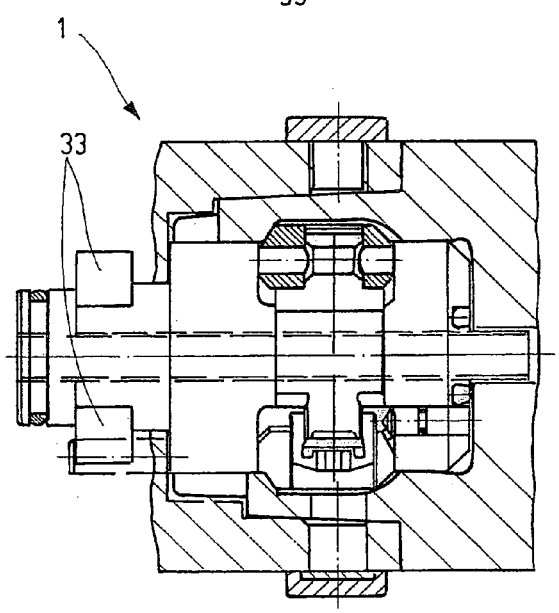
FIG. 3 shows a longitudinal section through the interface in the clamped state.

FIG. 3 shows an interface 1 in the clamped position. All the elements of the collet chuck 21 correspond to those which were explained and described in FIGS. 1 and 2. Consequently there will be no further discussion of these elements.

The actuating device 43 is activated to clamp the two parts 3 and 5 of the interface 1. By means of an actuating element, for example, an Allen key, the actuation opening 75 of the cap nut 55 is engaged through the first and second recesses 57 and 59 and the cap nut is set in rotation. With a rotation in a first direction, the cap nut 55 is shifted from the position shown in FIGS. 1 and 2 in which it is located at a minimum distance from the center axis 17: the cap nut 55 is moved outward on the second lug 51. This lug is provided with an external thread which meshes with an internal thread in the cap nut. The cap nut 55, for its part, is furnished with an external thread on its exterior which meshes with an internal thread in the second chuck jaw 41'. With a rotation of the cap nut 55, for example counter-clockwise, the cap nut is moved outward with respect to the center axis of the interface 1. The chuck jaw 41' is also moved outward so that pressure is exerted in the radial direction on the caging element 47. As a result, the first chuck jaw 41 is also moved radially outward. The two chuck jaws move in opposite directions with respect to the center axis 17 and travel into the circumferential groove 23. As a result, the clamping surfaces 45, 45' of the chuck jaws 41, 41' coact with the clamping shoulder 25. The faces of the clamping surfaces and of the clamping shoulder are aligned such that the second part 5 is urged to the left toward the center axis 17 into the female taper 7 until the flat surfaces 11 and 13 are firmly in contact with each other. Together with the clamping shoulder 25, the chuck jaws 41, 41' constitute a wedge ring which acts to advance the hollow shaft taper 9 to the left in the direction of the center axis 17 when the chuck jaws are pushed radially outward.

As a result of the radial outward movement of the chuck jaws 41, 41', the hollow shaft taper 9 is expanded so that its outer surface abuts firmly against the inner surface of the female taper 7, which results in a very precise clamping of the parts 3 and 5 of the interface 1 and in great rigidity. Because the actuating device 43 is acted upon in the area of the hollow shaft taper 9, in FIGS. 1 and 3 to the left of the first flat surface 11, the resulting overall length is extremely short and consequently the interface is precise and stable.

Figure 4:
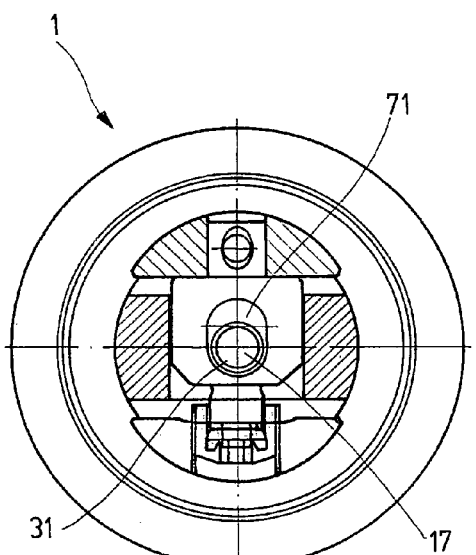
FIG. 4 shows a cross-section through the interface from FIG. 3.

FIG. 4 shows the interface 1 in the clamped position. It is clearly recognizable that the chuck jaws 41, 41' have been displaced radially outward. The caging element 47 is also displaced. From FIG. 4, particularly by comparison with FIG. 2, it is clear that the caging element 47 is moved upward when the interface is clamped. Because the passage 71 is configured as an elongated hole, the small tube 31 can remain positioned coaxial to the center axis 17 of the interface 1 even when the caging element 47 is shifted to its second operating position.

Overall, it is clear that the small tube 31 can be taken through the passage 71 with the interface in both the unclamped and the clamped position. Consequently, a straight coolant/lubricant supply without any changes of direction is possible so that separation and pooling can be positively prevented. This is particularly the case if the small tube 31 has a constant diameter and a smooth inner wall over its entire length.

Figure 5:
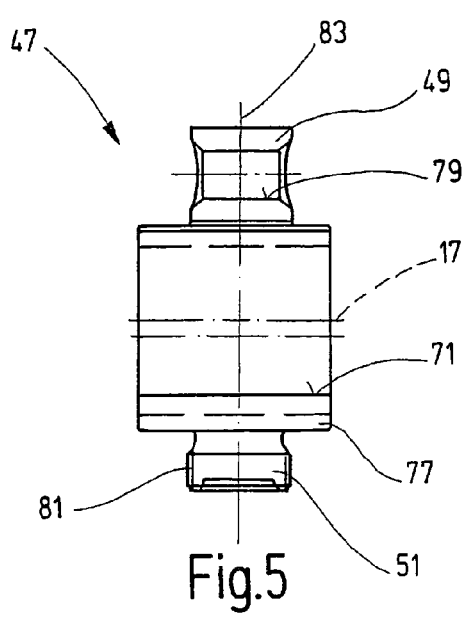
FIG. 5 shows an enlarged side view of a caging element of the interface.

FIG. 5 shows—somewhat enlarged—the caging element 47 in a side view. In this drawing it is clear that the first lug which runs perpendicular to the center axis 17 of the interface 1 projects on one side of the main body 77 of the caging element 47. Two parallel dot-dash lines can be seen in FIG. 5 which show the path of the center axis 17 of the interface 1 in the different operating positions of the actuating element 43. When the interface 1 is not clamped, the center axis 17 of the interface 1 runs higher up than in the clamped position. A comparison of FIGS. 2 and 4 shows this particularly clearly: in the unclamped state of the interface 1, the center axis 17, and with it the small tube 31, runs inside the passage 71 at the top. When the caging element 47 is moved upward to clamp the interface 1, the center axis 17 runs lower down through the passage 71. The small tube 31 is also positioned lower down, which can be seen from FIG. 4.

The first lug is provided with a recess 79 which locates the locking pin 53 which is shown in FIGS. 1 and 3.

The second lug 51 is located diametrically opposite the first lug 49. Here it can be seen clearly that it has an external thread which meshes with an internal thread on the cap nut 55, which is not shown here. If the cap nut is rotated in a first direction, it moves in the direction of the center axis 83 of the two lugs 49 and 51 toward the center axis 17. With an opposite direction of rotation, it moves outward and away from the main body 77 of the caging element 47. This position is shown in FIG. 4, while the radially inward position of the cap nut 55 is reproduced in FIG. 2.

Figure 6:
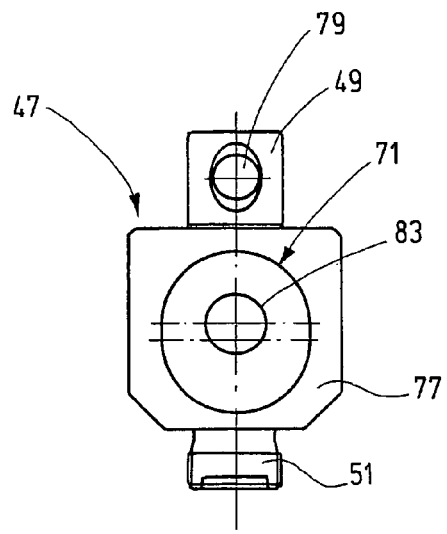
FIG. 6 shows a plan view of the caging element from FIG. 5.

In the drawing from FIG. 6, the caging element 47 is rotated by 90° so that it is possible to see into the passage 71 in the main body 77 of the caging element 47. The outer contour of the small tube 31 is indicated by a circle 83. It is clear that the dimensions of the passage 71 are chosen such that the small tube 31 can be taken through the passage 71 in both operating positions of the actuating device 43. Even without a small tube of this kind, a continuous straight coolant/lubricant passage can be realized in both instances.

FIG. 6 also shows the oppositely located lugs 49 and 51. Here the recess 79 through which the locking pin 53 can be passed is shown in plan view.

Figure 7:
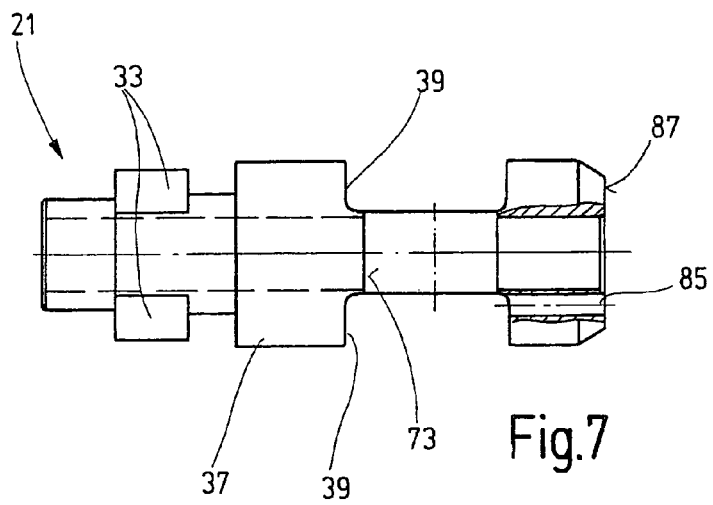
FIG. 7 shows a collet chuck for the interface in a side view.

FIG. 7 shows the collet chuck 21 without any installed parts. Identical parts are given the same reference numbers so that reference is made in this regard to the description for the preceding figures.

The projections 33 at the left end of the collet chuck 21 can be identified. They form part of the bayonet lock by means of which the collet chuck is anchored in the first part 3 of the interface 1. Recesses 39, 39' in which the chuck jaws 41, 41' come to rest can also be identified. FIG. 7 also shows the recess 73 which traverses the main body 37 of the collet chuck from top to bottom and serves to locate the caging element 47.

The right front part of the collet chuck 21 is shown in partial section to show a hole 85 in which the ejector pin 65 is housed. The length of the ejector pin is selected such that, on the one hand, it extends somewhat into the recess 39' to be able to coact there with chuck jaw 41'. On the other hand, the ejector pin 65 projects to the right beyond the face 87 of the collect chuck 21 in order to be able to exert pressure on the floor 69 of the cylindrical hole 19 in the second part 5 which serves to separate the two parts 3 and 5 when the interface 1 is in the unclamped state.

Figure 8:
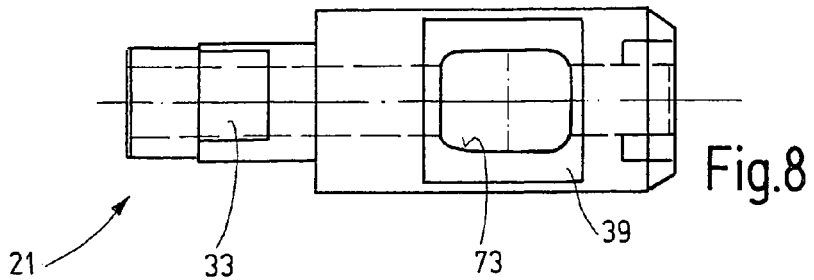
FIG. 8 shows a plan view of the collet chuck from FIG. 7.

Finally, FIG. 8 shows the collect chuck 21 depicted in FIG. 7 in plan view. Identical parts are given the same reference numbers. Here, the rectangular contour of the recess 39 can be seen and the recess 73 which traverses the floor of the recess and which serves to locate the caging element 47.

In what follows, the operation of the interface will be discussed once again in detail:

The interface 1 can be any type of connecting point between a machine tool equipped with a machine spindle and a tool, which includes connecting points between intermediate elements, extensions and adapters which connect to each other, to the machine spindle and/or to a tool. Preferably the interface 1 shown here is a machine spindle which represents the first part 3 and a tool which represents the second part 5.

The connection between machine spindle and tool is brought about in the initial unclamped state by the tool, meaning the second part 5, being inserted into the machine spindle, meaning the first part 3, wherein the hollow shaft taper 9 engages the female taper 7. The flat surface 11 of the first part 3 is at a small distance from the second flat surface 13 of the second part 5. The chuck jaws 41, 41' lie at a minimum distance from the axis of rotation 17 in the radially inward retracted position. This is achieved by inserting an actuating device, for example, an Allen key, through the recesses 59 and 57 into the actuating opening 75 of the cap nut 55 and rotating said nut such that it is located in its maximum inward position, meaning at a minimum distance from the center axis 17. Not only the cap nut 55 is moved in the direction of the center axis 17 as the result of its rotation. The chuck jaw 41' coacting with the cap nut 55 is moved toward the center axis 17. Since the chuck jaw 41' finally comes to rest against the main body 37 of the collet chuck 21, the opposite chuck jaw 41 is similarly drawn inward. The chuck jaws 41, 41' are preferably configured such that their outer surface aligns with the circumferential surface of the collect chuck 21 when it is moved completely inward in the radial direction.

The position discussed here is shown in FIGS. 1 and 2 in which the interface 1 can be seen in the unclamped state and the actuating element 43 is in its initial operating position, that is, in the released position.

To clamp the interface 1, the actuating device 43 is activated. That is to say, the cap nut 55 is rotated such that it moves outward onto the second lug 51 and in so doing drives the corresponding chuck jaw 41' and moves it outward in similar fashion. The displacement of the chuck jaw 41' for its part is based firstly on the outward movement of the cap nut, but secondly in this case, also on the fact that the cap nut 55 has an external thread which coacts with the internal thread in the chuck jaw 41' so that a relative motion takes place between cap nut 55 and chuck jaw 41'. The internal and external threads on the cap nut 55 have the same pitch in order to effect equal movement of the chuck jaws 41, 41'.

When the cap nut 55 is rotated, it is not only the chuck jaws 41, 41' that are shifted inward or outward diametrically opposite one another, the cage element 47 is moved up or down: in order to reach the unclamped position for the interface 1, the cage element 47 is moved down, and to reach the clamped operating position it is moved up.

When the two pieces 3 and 5 are clamped together, the chuck jaws 41, 41' are moved outward. Through the interaction of the clamping surfaces 45, 45' and the clamping shoulder described above, the hollow shaft taper 9 is pulled to the left into the interior of the female taper 7 because the collet chuck 21 is securely anchored in the first part 3 by means of the bayonet lock and cannot be shifted in the axial direction. The hollow shaft taper is expanded and pressed against the inner wall of the female taper 7. At the same time, the flat surfaces 11 and 13 are pressed firmly against each other so that optimal alignment of the interface 1 is achieved along with an extremely high degree of rigidity. Since the chuck jaw 41' is moved radially outward, the ejector pin 45 can be shifted to the left into the interior of the recess 39'. With an opposite movement of the chuck jaw 41', an inclined surface facing the center axis 17 at an angle acts on the ejector pin 75 such that the latter is pushed to the right and strikes the floor 69 of the cylindrical hole 19. With an additional movement of the chuck jaw 41' to the inside, the ejector pin 75 is urged to the right with such force that the two parts 3 and 5 are pushed apart and can be easily separated.

The forces that can be generated with the actuating device 43 are so high that secure clamping of the parts 3 and 5 is possible even when changing the tool manually. Similarly, such great force can be applied when the actuating device 43 is activated manually that the two parts 3 and 5 can be separated by means of the ejector pin 65.

It is possible to implement a central coolant supply by means of the caging element 47 of the actuating device 43. For this, a first conduit section in the first part 3 aligns with the passage 71 in the caging element 47 and with a second conduit section 29 in the second part 5. Since the passage 71 is configured as an elongated hole, a central passage for the coolant/lubricant can be implemented in both operating positions that are shown in FIGS. 2 and 4. Preferably a small tube 31 is inserted here to avoid all steps and edges in the area of the coolant/lubricant supply which would promote separation and pooling of the air/oil mixture when minimum quantity lubrication is used.

Because activation of the actuating device 43 in the embodiment shown here is implemented in the area of the hollow shaft taper 9, that is, to the left of the first flat surface 11, while ensuring optimal lubrication even when using minimum quantity lubrication, a very short overall length can be achieved, which results in extremely high rigidity in the interface 1 and exact concentricity because of the short overhang.

Moreover, it can be seen that the interface 1 is extremely simple in construction because the collet chuck 21 and its actuating device 43 require very few parts.

In order to protect the interface 1 from contamination, the cover ring 61 is provided which covers the access point for the actuating device 43 during operation and uncovers it as required. It is conceivable to move the cover ring 61 in the axial direction of the interface 1 to provide access or to equip it with a recess running radially which can uncover the access openings to the actuating device by rotating the ring, while the actuating device remains covered during operation.

From the explanations, it is clear that the actuating device 43 can also be designed differently while retaining the basic principle described here. For example, it is possible to anchor the second lug 51 to be rotatable in the main body 77 of the caging element 47. If the lug has an external thread which meshes with an internal thread in the second chuck jaw 41', the latter is moved in a radial direction inward or outward when the second lug 51 is rotated. This causes the interface to be clamped or unclamped. However, the embodiment described here with the cap nut 55 is preferred, because a greater axial movement of the chuck jaw 41' can be achieved through a rotational movement of the cap nut 55.

Similarly it would be conceivable to anchor a sleeve with an internal thread rotatably in the second chuck jaw 41' which cannot be moved radially to the center axis inside the chuck jaw 41' and which coacts with an external thread on the second lug 51. However, this would also result in a smaller axial displacement of the chuck jaw with a specific angle of rotation than with the embodiment shown here with the cap nut 55.

It is crucial that the actuating device 43 is implemented in such a way, meaning that it has a caging element 47, that a central coolant/lubricant conduit is not obstructed through a displacement perpendicular to the axis of rotation 17. This can be achieved by a suitable passage 71 in the caging element 47, as described above. Transitions, edges and similar between the first part 3 and the collet chuck 21 and between the latter and the second part 5 can be avoided by the use of a small tube 31, which was explained above in detail. Moreover, this small tube also eliminates edges and transitions in the area of the passage 71 for the caging element 47. It also allows a trouble-free coolant/lubricant supply in the area of the interface 1.

In addition, a very short overall shape is achieved, which is made possible by the flat surface 11 being located very close to the bearing points of a machine spindle, not shown here, which could correspond to the first part 3.

What is claimed is:

1. Interface of a tool having a first part comprising a seat configured as a female taper, which part has a first conduit section located concentrically with its center axis, a second part having a hollow shaft taper introduceable into the female taper, which part has a second conduit section located concentrically with its center axis and a hole with a wall which is provided with an annular groove surrounding a clamping shoulder, where the center axes of the first and second parts align, and having a collet chuck anchored in the first part having two chuck jaws which comprises an actuating device coacting with the chuck jaws which can be activated by means of an actuating element, where the chuck jaws engage the annular groove from inside in one operating position, wherein the collet chuck has a full-length central passage which continues firstly into the first conduit section in the first part and secondly into the second conduit section in the second part and in that the actuating device has a caging element which can be shifted to two operating positions and which has a central passage which is located such that the center axes of the first and second parts run through said passage in both operating positions, wherein the actuating device is accessible through a first radial recess in the hollow shaft taper and through a second radial recess provided in the first part and aligning with the first recess.

2. Interface in accordance with claim 1, wherein two lugs are provided on the caging element.

3. Interface in accordance with claim 2, wherein the first lug is connected to a first chuck jaw.

4. Interface in accordance with claim 3, wherein the second lug has an external thread which coacts with a second chuck jaw.

5. Interface in accordance with claim 1, wherein a cap nut is provided which is furnished with an internal thread coacting with the second lug and an external thread coacting with the second chuck jaw.

6. Interface in accordance with claim 5, wherein the cap nut is provided with an actuating opening for an actuator on the side facing away from the second lug, preferably configured as an indentation.

7. Interface in accordance with claim 5, wherein the internal thread and the external thread on the cap nut have the same pitch.

8. Interface in accordance with claim 1, further comprising a small tube which projects at least through areas of the conduit section in the first part, of the passage in the caging element and at least partially through areas of the second conduit section in the second part.

* * * * *